UNITED STATES PATENT OFFICE.

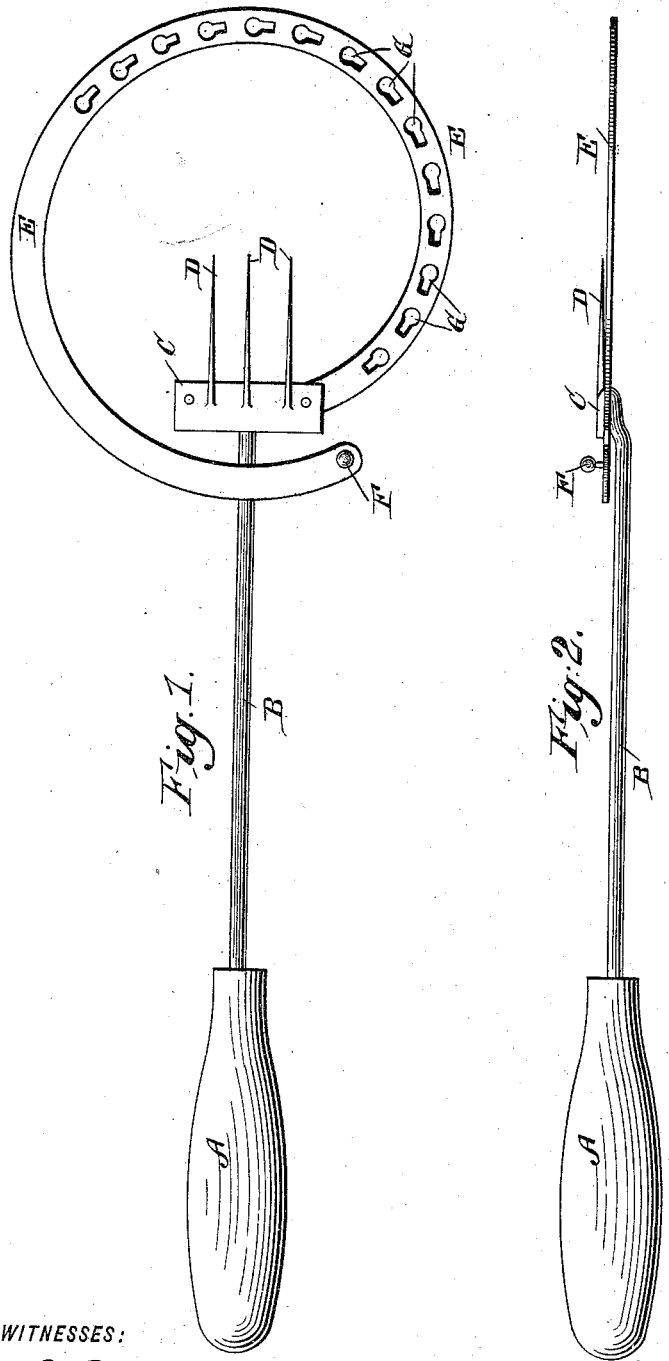

ANGELICA HOFHEIMER, OF BROOKLYN, NEW YORK.

TOASTING-FORK.

SPECIFICATION forming part of Letters Patent No. 555,952, dated March 10, 1896.

Application filed July 18, 1895. Serial No. 556,336. (No model.)

*To all whom it may concern:*

Be it known that I, ANGELICA HOFHEIMER, a citizen of the United States, and a resident of Brooklyn, in the county of Kings and State of New York, have invented certain new and useful Improvements in Toasting-Forks, of which the following is a specification, reference being had to the accompanying drawings, forming a part thereof, in which similar letters of reference indicate corresponding parts.

This invention relates to a toasting-fork designed to be used for toasting bread, although it may be used for broiling meat and for other purposes, as will hereinafter appear, and the object thereof is to provide a simple and effective device for this purpose; and the invention consists in the construction, combination, and arrangement of parts hereinafter described.

The invention is fully disclosed in the following specification, of which the accompanying drawings form a part, and in which—

Figure 1 is a plan view of my improved toasting-fork, and Fig. 2 a side view thereof.

In the practice of my invention I employ a handle A provided with a metal shaft B, which is provided at its end with a head C, to which are secured or on which are formed outwardly-directed points or forks D.

The head C is oblong in form and arranged at right angles to the handle B, and secured to one end thereof is an open metal strap or ring E, one end of which is curved around in the form of a circle or ring and is provided with a headed pin or projection F, as clearly shown in Figs. 1 and 2.

That end of the metal strap or ring E which is secured to the head C is provided with holes or openings G, which extend around about half of the length thereof, and said holes or openings G are larger at one end than the other, the smaller end being directed toward the head C.

As thus constructed, the size of the ring may be varied by inserting the head of the pin or projections F through the holes G, where it will held, as will be readily understood, by the smaller end of said openings, the spring action of the material of which the strap or ring is composed being sufficient to pull the headed pin or projection into the smaller ends of said openings, from which the pin cannot be removed.

As thus constructed, the forks D project toward the central portion of the ring E, and in operation a piece of bread is secured to these forks, and will rest upon the ring, and may be held in the desired position to properly toast the same, and may be turned so as to present either side thereof to the fire, and it will also be apparent that meat may be broiled in the same manner.

It is evident that changes in the form, construction, and arrangement of the various parts of my improved toaster or broiler may be made without departing from the spirit of my invention or sacrificing its advantages, and I therefore reserve the right to make such alterations therein as fairly come within the scope thereof.

Having fully described my invention, I claim and desire to secure by Letters Patent—

1. A toaster or broiler, comprising a handle, a shaft connected therewith, and a head connected with said shaft, provided with forks or projections by means of which the article to be toasted or broiled is held in position, said head being also provided with a ring which forms an additional support for the article, substantially as shown and described.

2. A toaster or broiler, comprising a handle, a shaft connected therewith and a head connected with said shaft, provided with forks or projections by means of which the article to be toasted or broiled is held in position, said head being also provided with a ring which forms an additional support for the article, said ring being divided and one end thereof being secured to the head, and the other end being adapted to be connected with the fixed end of the ring, substantially as shown and described.

3. A toaster or broiler, comprising a handle, a shaft connected therewith and a head connected with said shaft, provided with forks or projections by means of which the article to be toasted or broiled is held in position, said head being also provided with a ring which forms an additional support for the article, said ring being divided and one end thereof being secured to the head and the other end being adapted to be connected with the fixed end of the ring, said fixed end being provided with a longitudinal row of perforations and the free end being provided with a pin or projection adapted to be inserted therein, by means of which the ring is adjustable in size, substantially as shown and described.

4. A toaster or broiler, comprising a handle, a shaft connected therewith and a head connected with said shaft, provided with forks or projections by means of which the article to be toasted or broiled is held in position, said head being also provided with a ring which forms an additional support for the article, said ring being divided and one end thereof being secured to the head and the other end being adapted to be connected with a fixed end of the ring, said fixed end being provided with a longitudinal row of perforations, and the free end being provided with a pin or projection adapted to be inserted therein by means of which the ring is adjustable in size, and the forks or projections connected with the head being so formed as to project toward the central portion of the ring, substantially as shown and described.

In testimony that I claim the foregoing as my invention I have signed my name, in presence of two witnesses, this 25th day of June, 1895.

ANGELICA HOFHEIMER.

Witnesses:
L. M. MULLER,
C. GERST.